(12) United States Patent
Verma et al.

(10) Patent No.: US 11,650,805 B2
(45) Date of Patent: May 16, 2023

(54) RELIABLE FEATURE GRADUATION

(71) Applicant: Microsoft Technology Licensing, LLC, Redmond, WA (US)

(72) Inventors: Nidhi Verma, Redmond, WA (US); Ankur Jauhari, Bothell, WA (US); Min Shao, Bellevue, WA (US); Shobana Krishnamoorthy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/903,061

(22) Filed: Jun. 16, 2020

(65) Prior Publication Data
US 2021/0342139 A1     Nov. 4, 2021

Related U.S. Application Data

(60) Provisional application No. 63/018,995, filed on May 1, 2020.

(51) Int. Cl.
*G06F 8/65*     (2018.01)
*G06F 11/36*    (2006.01)

(52) U.S. Cl.
CPC ............ *G06F 8/65* (2013.01); *G06F 11/3668* (2013.01)

(58) Field of Classification Search
USPC ........................................................ 717/124
See application file for complete search history.

(56) References Cited

U.S. PATENT DOCUMENTS

| | | | |
|---|---|---|---|
| 7,954,090 B1 | 5/2011 | Qureshi et al. | |
| 10,013,337 B2* | 7/2018 | Eberlein | G06F 11/3664 |
| 10,341,465 B2 | 7/2019 | Krishnamoorthy et al. | |
| 10,735,262 B1* | 8/2020 | Webb | H04L 67/1004 |
| 11,099,826 B2* | 8/2021 | Vittal | G06F 8/65 |

(Continued)

OTHER PUBLICATIONS

Matt Young; "What are Canary Launching and Dark Testing?"; Functionize.com website [full url in ref.]; Mar. 17, 2020 (Year: 2020).*

(Continued)

*Primary Examiner* — Qing Chen
*Assistant Examiner* — Clint Thatcher

(57) ABSTRACT

Reliable feature deployment is provided. Features are evaluated for their readiness to be graduated and features that are ready to be graduated are added to a graduation list. When features are added to the graduation list, evaluation of the features is discontinued, thereby reducing the performance and runtime costs associated with deploying features. Furthermore, engineers can consult the graduation list to identify features that are ready for graduation, thereby reducing the risk of premature flight graduation. Data associated with features is analyzed to map the features to corresponding flights. In this way, when an engineer identifies a feature for graduation, the engineer is able to identify the corresponding flight (or flights) from the mapping. Even when a feature is selected for graduation, the present systems provide additional safeguards to ensure that corresponding flights are not improperly or prematurely graduated, thereby preventing a subpar customer experience.

20 Claims, 9 Drawing Sheets

(56) References Cited

U.S. PATENT DOCUMENTS

| | | | |
|---|---|---|---|
| 2019/0034315 A1* | 1/2019 | Acosta | G06F 11/3409 |
| 2019/0138288 A1* | 5/2019 | Brealey | G06F 8/65 |
| 2019/0317754 A1* | 10/2019 | Mosquera | G06Q 10/06316 |
| 2020/0019400 A1 | 1/2020 | Zhao et al. | |
| 2020/0327035 A1* | 10/2020 | Emaru | G06F 11/302 |
| 2021/0029211 A1* | 1/2021 | Varadarajan | H04L 65/104 |

OTHER PUBLICATIONS

Christopher Grant; "Deployment Strategies & Release Best Practices"; Medium.com website [full url in ref.]; May 30, 2017 (Year: 2017).*

Gregory Batchelor; "Why Product Managers Should Slot Feature Flags into Their Agile Roadmap"; abtasty.com website [full url in ref.]; Dec. 17, 2019 (Year: 2019).*

"Feature Toggle"; Wikipedia.org webpage; Apr. 1, 2020 (Year: 2020).*

Emily Williamson; "Five Best Practices for Feature Flagging"; DevOps.com website [full url in ref.]; 2019 (Year: 2019).*

Dawn Parzych; "7 Feature Flag Best Practices for Short-Term and Permanent Flags"; LaunchDarkly.com website [full url in ref.] (Year: 2019).*

Dawn Parzych; "Feature Flags Best Practices: Release Management"; LaunchDarkly.com website [full url in ref.] (Year: 2019).*

Jeff Sing; "How to Manage Outdated Feature Flags"; Optimizely.com website [full URL in ref.]; Jul. 16, 2019 [Examiner is including an enlarged, cleaner copy of this IDS reference for the record] (Year: 2019).*

Asa Schachar; "Prevent Technical Debt by Knowing When to Remove Feature Flags"; DevOps.com website [full URL in ref.]; Apr. 14, 2020 (Year: 2020).*

Pete Hodgson; "Feature Toggles (aka Feature Flags)"; martinfowler.com website [full URL in ref.]; Oct. 9, 2017 (Year: 2017).*

"SAP Cloud Platform Feature Flags", Retrieved From: https://help.sap.com/doc/8b9fe656f42d4ad8a881b18eacb5415f/Cloud/en-US/loio682cd665d8f348e09abe51f0821bd664.pdf, Nov. 21, 2019, 46 Pages.

"There's a Better Way to Release Software to Your Users" Retrieved From: https://web.archive.org/web/20200415053821/https:/rollout.io/, Apr. 15, 2020, 5 Pages.

Baker, Justin, "The Dark Launch: How Google & Facebook Release New Features", Retrieved From: https://tech.co/news/the-dark-launch-how-googlefacebook-release-new-features-2016-04, Apr. 20, 2016, 4 Pages.

Hodgson, Pete, "Feature Release Maturity Model", Retrieved From: https://rollout.io/blog/feature-release-maturity-model/, Jun. 19, 2017, 16 Pages.

Schaub, Willy-Peter, "Deploying New Releases: Feature Flags or Rings?", Retrieved From: https://opensource.com/article/18/2/feature-flags-ring-deployment-model, Feb. 8, 2018, 8 Pages.

Sing, Jeff, "How to Manage Outdated Feature Flags", Retrieved From: https://blog.optimizely.com/2019/07/16/manage-outdated-feature-flags/?utm_campaign=asaschachar-blog-featureflag-ownership-models, Jul. 16, 2019, 5 Pages.

"International Search Report and Written Opinion Issued in PCT Application No. PCT/US21/025698", dated Jul. 19, 2021, 12 Pages.

* cited by examiner

RELIABLE FEATURE GRADUATION

CROSS-REFERENCE TO RELATED APPLICATIONS

This application claims the benefit of U.S. Provisional Application Ser. No. 63/018,995, entitled "RELIABLE FEATURE GRADUATION," filed May 1, 2020, the entire disclosure of which is hereby incorporated by reference herein in its entirety.

Software products and services are increasingly provided to customers (or tenants) that are hosted in cloud computing environment. Cloud computing environments involve a distributed set of resources, including memory, processing units, and data storage communicatively coupled via a secured network. This type of distributed infrastructure enables software providers to dynamically allocate resources such that tenants can seamlessly scale up or scale down usage. When deploying and testing new and updated software, providers must also utilize resources within the cloud computing environment. Thus, method and systems for reducing resource overhead, while also improving scalability and reliability, are needed to better deploy software.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by systems and methods for reliably deploying software. Currently, large-scale software-as-a-service (SaaS) providers (hereinafter "software providers") continuously deploy features to a worldwide customer base. These features may be new or may comprise updates to existing features. In general, a feature may be associated with an operation, such as uploading a file, creating a list, sharing a file, authenticating a request, creating a webpart, etc. Traditionally, feature rollout is composed of two parts: code "rollout" and code "light up." That is, the code associated with a feature is first deployed (rolled out) and then enabled (lighted up or turned ON). Stated another way, the code is deployed "dark" (e.g., with the associated feature turned OFF) and then is later enabled (e.g., turned ON) via a control mechanism called a "flight." A flight is a code stub or marker in the code; however, the flight responsible for lighting up (or enabling) a corresponding feature is not logically linked to the feature.

Furthermore, deployed code is generally not enabled for all tenants at the same time; rather, each feature is enabled in stages, or click stops, for random sets of deployed code. For instance, a feature may be enabled for 1%, then 5%, then 10%, etc. After each stage, the enabled features may be evaluated to ensure code stability and user satisfaction. As used herein, "evaluation" involves runtime processing that may include collecting and evaluating telemetry data, performing regression analysis, evaluating customer complaints or issue reports, or any other type of evaluation. Not only so, but evaluation of a feature continues until graduation of the flight that enabled the feature. "Graduation" of a flight refers to removal of the code stub (or control mechanism) that enabled a feature, and graduation should only occur when the feature has been fully deployed and enabled for all customers globally. Graduation is beneficial because idle code stubs cause the body of code to become bulky, potentially causing errors and increasing processing overhead. However, the flight responsible for enabling a feature is dissociated from the feature and it is difficult for an engineer to determine when to graduate a flight. If graduation of a flight is improperly or prematurely performed, the associated feature may become disabled for all or a portion of tenants, causing customer dissatisfaction and frustration. Here, improper graduation may refer to improper removal of the code stub (such as partial removal), whereas premature graduation may refer to removing the code stub prior to complete deployment and enablement of the corresponding feature. For instance, while an engineer may wait for some period of time before removing the code stub, removal of the code stub may be premature if the corresponding feature was not 100% deployed/enabled and/or the feature was recently edited (e.g., within a configurable period of time).

As should be appreciated, the evaluation of features described above involves allocation of one or more resources within the cloud computing environment that may be measured in terms of "performance cost" or "CPU consumption." For instance, a flight Dynamic-link library ("DLL") may be loaded and continue runtime execution for each feature until the feature is graduated. This performance cost is an overhead cost to the software provider, which limits the scalability of feature deployment; moreover, allocating resources to feature deployment can cause service disruptions for customers. As should be appreciated, for large software providers, thousands of features may be in different stages of deployment at any one time. Accordingly, reduction of the performance cost associated with feature deployment would be highly desirable.

The disclosed systems solve the above-identified issues by evaluating features to determine whether the features are ready for graduation. That is, rather than allowing features to continue to be evaluated until an engineer decides to graduate the flights responsible for enabling the features, the present systems evaluate features for their readiness to be graduated. For instance, it may be determined that features are ready for graduation when they have been 100% deployed and enabled globally (e.g., the global customer base), are not identified on an exclusion list, and have not been reviewed or edited (e.g., updated) for a configurable period of time. When features are ready to be graduated, the features may be added to a graduation list and evaluation of the features may be discontinued, thereby reducing the performance cost associated with deploying features. Furthermore, engineers can consult the graduation list to identify features that are ready for graduation, thereby reducing the risk of premature flight graduation. Further still, the present systems and methods analyze data associated with features in order to map the features to corresponding flights. In this way, when an engineer identifies a feature from the graduation list that is ready for graduation, the engineer is able to identify the corresponding flight (or flights) from the mapping in order to remove it. However, even when a feature is selected for graduation, the present systems provide additional safeguards to ensure that corresponding flights are not improperly or prematurely graduated, thereby preventing a subpar customer experience.

In aspects, a computer-implemented method for reliable feature graduation is provided. The method includes deploying code for a feature of a plurality of features to a plurality of tenants. The method further includes initiating at least one control mechanism to enable the deployed code for a first subset of users associated with the plurality of tenants and evaluating use of the feature by the first subset of users.

Additionally, the method includes initiating the at least one control mechanism to enable the deployed code for at least a second subset of users associated with the plurality of tenants and evaluating use of the feature by the first subset and at least the second subset of users. In response to the evaluation of the feature, the method further includes determining that the feature is ready to be graduated, adding the feature to a graduation list, and discontinuing evaluation of the feature.

In further aspects, a system including at least one processor and at least one memory storing computer-executable instructions that when executed by the at least one processor cause the system to perform operations. The operations include deploying code for a feature of a plurality of features to a plurality of tenants. The operations further include initiating at least one control mechanism to enable the deployed code for the plurality of tenants and evaluating use of the feature by the plurality of tenants. Based on the evaluation of the feature, the operations include linking the at least one control mechanism to the feature. The operations further include determining that the feature is ready to be graduated, adding the feature to a graduation list, and discontinuing evaluation of the feature.

In still further aspects, a computer storage medium is provided. The computer storage medium stores computer-executable instructions that when executed a processor cause a computer system to perform operations. The operations include deploying code for a feature of a plurality of features to a plurality of tenants and initiating at least one control mechanism to enable the deployed code for the plurality of tenants. Additionally, the operations include evaluating use of the feature by the plurality of tenants and, based on the evaluation of the feature, linking the at least one control mechanism to the feature. The operations further include, based on the evaluation of the feature, determining that the feature is ready to be graduated, adding the feature to a graduation list, and discontinuing evaluation of the feature.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present methods and systems are directed to reliable feature deployment. For instance, the systems evaluate features for their readiness to be graduated by evaluating whether features have been 100% deployed and enabled globally (e.g., the global customer base), are not identified on an exclusion list, and have not been reviewed or edited (e.g., updated) for a configurable period of time. When features are ready to be graduated, the features may be added to a graduation list and evaluation of the features may be discontinued, thereby reducing the performance cost associated with deploying features. Furthermore, engineers can consult the graduation list to identify features that are ready for graduation, thereby reducing the risk of premature flight graduation. Further still, the present systems and methods analyze data associated with features in order to map the features to corresponding flights. In this way, when an engineer identifies a feature from the graduation list that is ready for graduation, the engineer is able to identify the corresponding flight (or flights) from the mapping in order to remove it. However, even when a feature is selected for graduation, the present systems provide additional safeguards to ensure that corresponding flights are not improperly or prematurely graduated.

Figure 1:
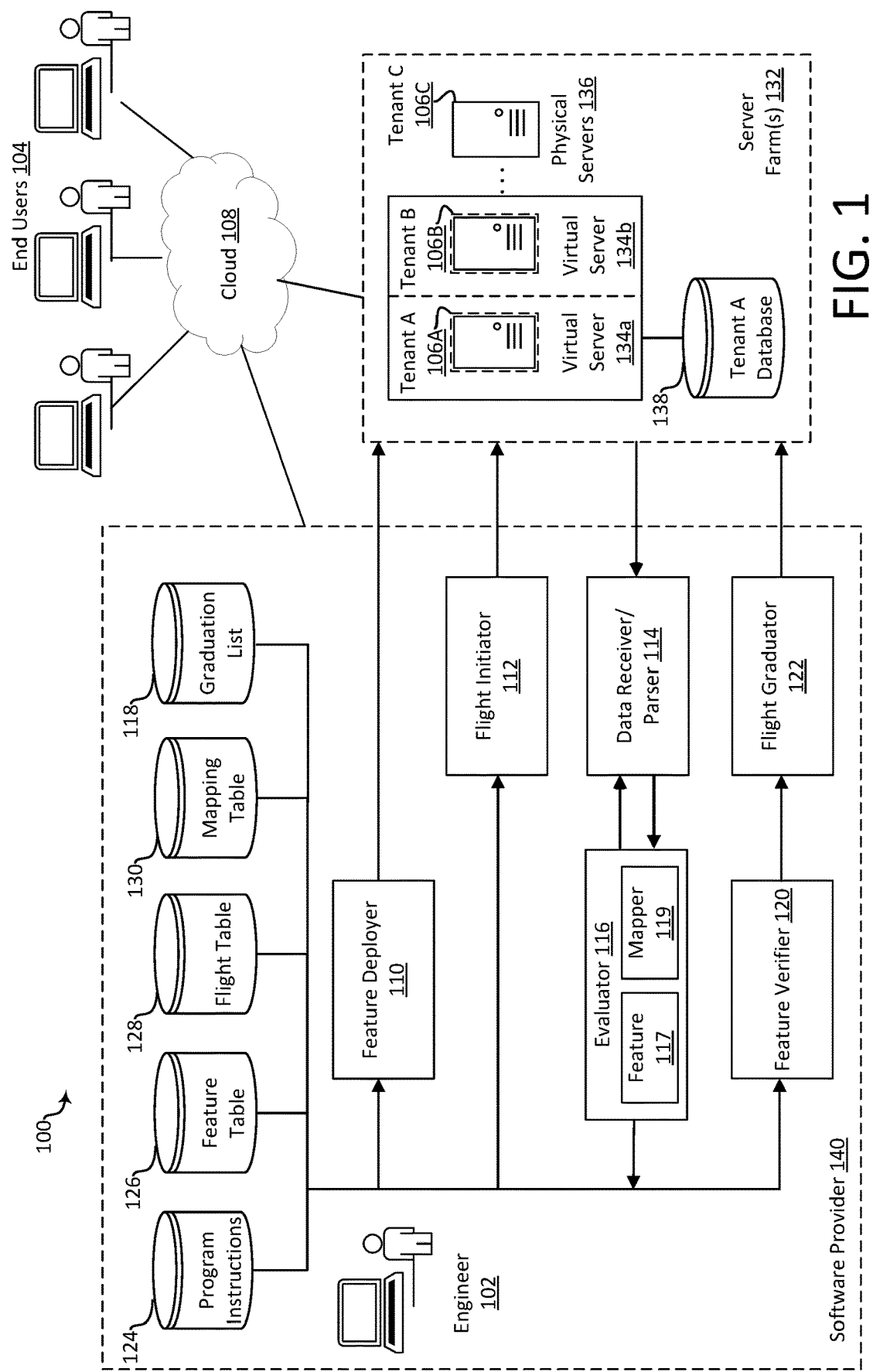
FIG. 1 illustrates an example system for reliable feature graduation in accordance to aspects of the present disclosure.

FIG. 1 illustrates an example system for reliable feature graduation in accordance to aspects of the present disclosure. System 100 represents a system for implementing reliable feature graduation.

Engineer 102 may develop program instructions for executing a feature. For example, a feature may be associated with an operation, such as uploading a file, creating a list, sharing a file, authenticating a request, creating a webpart, etc. In aspects, engineer 102 may provide the program instructions to program instructions storage 124. In some aspects, engineer 102 may provide an indication to deploy the program instructions associated with a feature to feature deployer 110. Feature deployer 110 may then distribute the program instructions to customers of software provider 140. In some cases, feature deployer 110 may maintain a status of features that have been selected for deployment, are being deployed, and/or have completed deployment in feature table 126. As used herein, "customers" of software provider 140 may correspond to "tenants" (e.g., tenant A 106a, tenant B 106b, and tenant C 106c) that are hosted by software provider 140 in a cloud computing environment 108. In aspects, the program instructions (e.g., code) associated with a feature are deployed "dark" (e.g., with the associated feature turned OFF) by feature deployer 110.

In aspects, after the program instructions for a feature have been fully deployed (e.g., have been deployed to all tenants), engineer 102 may provide an indication to flight initiator 112 to initiate a control mechanism (e.g., also referred to herein as a "flight") for the feature. A flight is a code stub or marker in the code responsible for lighting up (or enabling) a corresponding feature. Flight initiator 112 may light up (or enable) features in stages, or click stops, for random sets of deployed code. For instance, a feature may be enabled for 1%, then 5%, then 10%, etc., of a scope. As used herein, a "scope" may refer to a tenant, a group of tenants, a server farm, a group of server farms, a group of users, or any other logical division of the cloud computing environment 108. For instance, the flight initiator 112 may enable deployed code for a feature for a first subset of users in a first stage (e.g., enabling 1% of a scope), then for a second (larger) subset of users in a second stage (e.g., enabling 5% of the scope), then for a third (larger) subset of users in a third stage (e.g., enabling 10% of the scope), and so on until all of the deployed code for the feature has been enabled (turned ON) within the scope. In some aspects, an exclusion list may prevent some features from being deployed and/or enabled for some portion of the scope (e.g., excluding a particular tenant or tenants). For instance, an exclusion list may prevent a feature from being deployed and/or enabled based on customer properties (e.g., segment group such as "education"), a unique tenant identifier (e.g., a tenant GUID), a customer request under change management, and the like. In further aspects, flight initiator 112 may maintain a status of the stages of enabling the deployed code for each feature in flight table 128. Traditionally, however, as noted above, the process of initiating flights to enable (or turn ON) deployed code is not logically linked to the corresponding feature.

End users 104 may use computing devices to access software products and services offered by software provider 140 via cloud computing environment 108. For instance, each end user 104 of a plurality of end users 104 may be associated with a tenant (e.g., tenant A 106a, tenant B 106b, and tenant C 106c) hosted by the software provider 140 on cloud computing environment 108. Cloud computing environment 108 may comprise one or more resources, including one or more servers (e.g., comprising processing units and memory) and one or more databases communicatively coupled over a secure network. The cloud computing environment may be organized into one or more server farm(s) 132 containing one or more virtual servers 134 and one or more physical servers 136. For example, virtual servers 134a/b partitioned on one or more physical servers 136 may provide the functionality (e.g., processing and memory) of a dedicated server to one or more tenants. Tenant A 106A may use one virtual server 134a and tenant B 106B may use another virtual server 134b, for example. Tenant data may be stored in databases (e.g., tenant A database 138) that are communicatively coupled to a corresponding virtual or physical server (e.g., virtual server 134a).

Virtual servers 134a/b and physical servers 136 collectively form a server farm 132. Memory associated with the respective virtual servers 134a/b and physical servers 136 may store program instructions (e.g., code) for execution by a Central Processing Unit (CPU), not shown in the figure. Execution of the program instructions makes features (e.g., operations) available for use by end users 104. New program instructions (e.g., new code) may be deployed and enabled to provide new features. Thus, server farm(s) 132 provide end users 104 access to software products and services administered by software provider 140, such as uploading files, sharing files, authenticating requests, creating webparts, etc. In aspects, millions of end users 104 associated with thousands of tenants may access various application services made available through cloud computing environment 108.

As noted above, a feature may be enabled (e.g., turned ON) in stages, or click stops, for random sets of deployed code (e.g., 1%, then 5%, then 10%, etc., of a scope). In this way, at each stage, an enabled feature may be tested before a full-scale distribution. In aspects, early stages may enable the code for a small subset of users (e.g., 1% or 5%). Thus, regression analysis and other evaluations may be conducted before the feature is enabled (e.g., turned ON) for a broader customer base, thereby preventing customer service disruptions and/or feature dissatisfaction. During these testing periods, data may be collected from end users of tenants for whom the feature has been enabled (e.g., turned ON). Traditionally, the data would be continuously collected, after the feature has been enabled for 100% of tenants and until the feature is graduated. The collected data may include telemetry data (e.g., data collected based on use of the feature), log data (e.g., exception logs, error reports), customer complaints, or any other data associated with performance of or customer satisfaction with a feature. Additionally, collected data may include statuses for each stage of enabling a feature, exclusion list(s) for a feature, and/or information regarding any engineer reviews of the feature and/or engineer updates to program instructions for the feature. The collected data may be received from the system and/or one or more tenants by data receiver/parser 114. Data receiver/parser 114 may classify, organize, correlate, or otherwise compile the collected data for evaluation by evaluator 116.

Evaluator 116 may receive the collected data from data receiver/parser 114. In some aspects, evaluator 116 may include two components, feature evaluator 117 and flight mapper 119. For example, feature evaluator 117 may receive telemetry data and may perform regression analysis to quantify relationships between different variables associated with implementing the feature and/or statistically determine the probabilities for success or failure of the feature. Additionally or alternatively, feature evaluator 117 may evaluate the program instructions associated with a feature to identify errors (e.g., utilizing a debugger). Additionally or alternatively, feature evaluator 117 may evaluate customer complaints (e.g., or the existence of customer complaints) regarding a feature. If any exceptions (e.g., issues) are identified, an engineer (e.g., engineer 102) may be alerted to evaluate the feature and/or update the program instructions associated with the feature. In still other aspects, feature evaluator 117 may evaluate the feature to determine if the feature is ready to be graduated. For instance, feature evaluator 117 may determine whether the feature has been 100% deployed and enabled for all tenants (e.g., the global customer base), the feature was not identified on an exclusion list, and the feature has not been reviewed or edited (e.g., updated) for a configurable period of time. For instance, depending on the feature, the feature evaluator 117 may confirm that the feature has not been edited for 7 days (for low risk features), 14 days (for medium risk features), or 30 days (for higher risk features). In aspects, the period of time can be any period in a range from 1 day to 60 days, for example.

If the feature evaluator 117 determines that the feature is ready for graduation (i.e., the feature is 100% deployed/enabled worldwide, the feature is not identified on an exclusion list, and the feature has not been edited within the period of time), the feature evaluator 117 may add the feature to a graduation list 118. When the feature is added to graduation list 118, the feature may be "frozen" or "placed on ice" such that evaluation of the feature may be discontinued. By "freezing" features, runtime costs associated with evaluating a feature that is ready for graduation (but has not been graduated) are eliminated, thereby reducing the overall overhead associated with feature deployment.

As noted above, the process of initiating flights to enable (or turn ON) deployed code is not logically linked to the corresponding feature (or operation) resulting from executing the deployed code. That is, the evaluation of the feature is disconnected from the process that turns ON that feature. Accordingly, it is difficult for engineers to determine whether and when a flight (or flights) corresponding to a feature should be graduated. Often, an engineer may simply wait for some period of time after initiating a flight (e.g., loading the flight DLL) and then may graduate the flight without an understanding of how the corresponding feature is performing (e.g., whether the feature has been edited) or whether the corresponding feature has even been fully deployed (e.g., identified on an exclusion list) and/or fully enabled (e.g., staged enablement of deployed code is not complete). To address this issue, evaluator 116 also includes flight mapper 119. Flight mapper 119 may evaluate data (e.g., telemetry data) associated with user implementation of the feature to map the feature to a corresponding flight (or flights) that enabled the feature. In some aspects, the flight mapper 119 may create a mapping table 130 (or other relational database) that links each feature to a corresponding flight (or flights). That is, each feature may be comprised of many flights (e.g., stubs in the code). By using special tags in the flight code, the flights may be grouped together and mapped to a particular feature.

As noted above, features that are determined to be ready for graduation are "frozen" by adding them to a graduation list 118. In this way, the runtime costs associated with evaluating these features that are ready for graduation (but have not been graduated) are eliminated, thereby reducing the overall overhead associated with feature deployment. Additionally, when features are identified on the graduation list 118, engineers can be assured that the features are ready for graduation (i.e., 100% deployed/enabled worldwide, not identified on an exclusion list, and not edited within a period of time) before the flight is graduated. In this way, the risk of premature flight graduation is reduced. However, as an additional safeguard before graduating a flight corresponding to a feature on the graduation list 118, additional verifications may be performed. For instance, while the feature was pending on the graduation list 118, the feature may have been edited or may otherwise have been reviewed (e.g., a customer complaint was received). Accordingly, when an engineer selects a feature for graduation from the graduation list 118, feature verifier 120 may verify that the feature remains ready for graduation. For instance, data associated with the feature may be accessed to confirm that the feature was not reviewed and/or edited while the feature was pending on the graduation list 118.

Once feature verifier 120 verifies that the feature remains ready for graduation, flight graduator 122 may identify the flight corresponding to the selected feature based on mapping table 130. As a further safeguard, flights may be removed based on a ramp down policy. That is, the flight (code stub) may be removed first from deployed code that was enabled for a first subset of users in a first stage (e.g., 1% of a scope), then removed from deployed code that was enabled for a second subset of users in a second stage (e.g., 5% of a scope), and so on. In this way, if removal of the code stub proves to be improper for some reason, a customer outage is limited to the first 1% of the most dormant scope (e.g., a tenant, a server farm, etc.). Additionally or alternatively, flight graduator 122 may perform a "soft delete" of the flight. For instance, in response to receiving an indication from an engineer (e.g., engineer 102) to remove the flight, flight graduator 122 may postpone deletion for a configurable wait period. For example, the configurable wait period may be 7 days for a low-risk (low usage) feature, 14 days for a medium-risk (medium usage) feature, 30 days for a high-risk (high usage) feature, and so on. In some aspects, the wait period may be any period in a range from 1 day to 60 days, for example.

As should be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
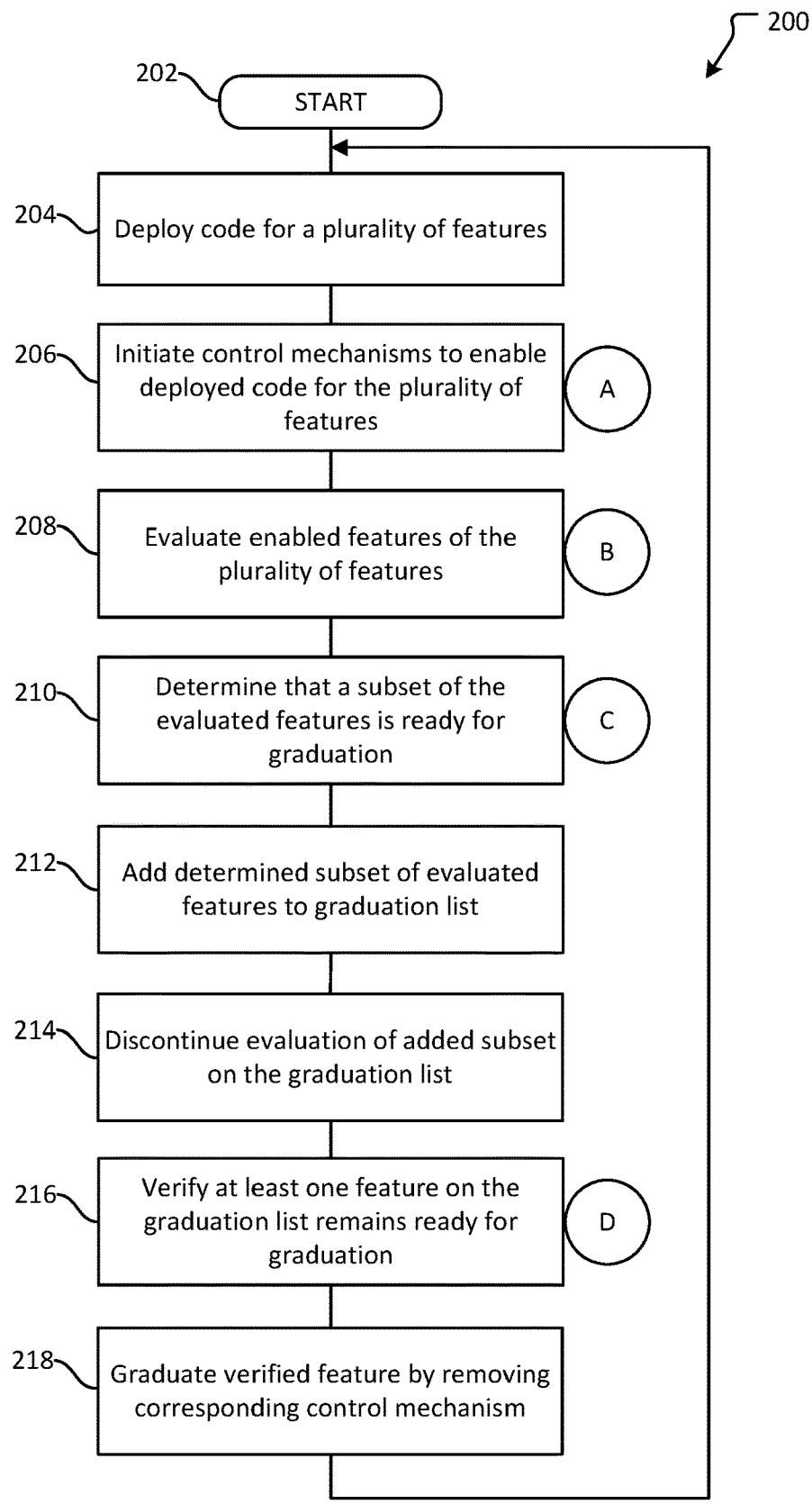
FIG. 2 illustrates an example method for reliably graduating features in accordance with aspects of the present disclosure.

FIG. 2 illustrates an example method for reliably graduating features in accordance with aspects of the present disclosure.

A general order of the operations for the method 200 is shown in FIG. 2. Generally, the method 200 starts with start operation 202 and may continually recur after graduate operation 218. The method 200 may include more or fewer steps and/or may progress in a different order of steps from those shown in FIG. 2. The method 200 can be executed as a set of computer-executable instructions executed by a computer system and encoded or stored on a computer readable medium. Further, the method 200 can be performed by gates or circuits associated with a processor, an ASIC, an FPGA, a SOC or other hardware device. Hereinafter, the method 200 shall be explained with reference to the systems, components, devices, modules, software, data structures, data characteristic representations, signaling diagrams, methods, etc., described in conjunction with FIGS. 1, 3-7B.

At deploy operation 204, program instructions (i.e., code) corresponding to a plurality of features may be deployed to customers (e.g., tenants) of a software provider. Based on the program instructions, features may be released, enhanced, updated, or replaced for use by tenants and their corresponding end users. In aspects, engineers (e.g., engineer 102) may provide program instructions for various features to program instructions storage 124. The same or different engineers may then select one or more features for deployment to tenants (e.g., via feature deployer 110). In aspects, the program instructions (e.g., code) associated with a feature are deployed "dark" (e.g., with the associated feature turned OFF).

At initiate operation 206, control mechanisms (e.g., flights) corresponding to the plurality of deployed features may be initiated. For example, once a feature has been deployed, a corresponding flight (or flights) may be initiated to enable (e.g., light up or turn ON) the deployed code associated with the feature. When a feature is enabled, the feature may be utilized by end users. For instance, an end user may perform an operation associated with and enabled feature such as uploading a file, creating a list, sharing a file, authenticating a request, creating a webpart, etc. As noted above, a feature may be enabled (e.g., turned ON) in stages, or click stops, for random sets of deployed code (e.g., 1%, then 5%, then 10%, etc., of a scope). In this way, at each stage, an enabled feature may be tested before a full-scale distribution. In aspects, early stages may enable to deployed code for a small subset of users (e.g., 1% or 5% of a scope). Thus, regression analysis and other evaluations may be conducted before the feature is released to a broader customer base, thereby preventing customer service disruptions and/or feature dissatisfaction.

At evaluate operation 208, enabled features of the plurality of deployed features may be evaluated. That is, once a feature has been enabled (e.g., turned ON), the use of the feature by end users may be evaluated. For example, telemetry data may be used to perform regression analysis to quantify relationships between different variables associated with implementing the feature and/or statistically determine the probabilities for success or failure of the feature. Additionally or alternatively, the program instructions associated with the feature may be evaluated to identify errors (e.g., utilizing a debugger). Additionally or alternatively, customer complaints (e.g., or the existence of customer complaints) regarding the feature may be evaluated. If any exceptions (e.g., issues) are identified regarding the feature, an engineer may be alerted to review the feature and/or update the program instructions associated with the feature. As noted above, an evaluation of the feature following each stage of enablement (e.g., after 1%, 5%, 10%, etc.) may be conducted. Moreover, as noted above, evaluation of the feature and/or the program instructions associated with the feature may continue to be performed until the feature is graduated.

At determine operation 210, a subset of the evaluated features may be determined ready for graduation. For instance, it may be determined whether the subset of features had been 100% deployed and enabled for all tenants (e.g., the global customer base). Additionally, it may be determined that none of the subset of features was identified on an exclusion list. For example, it may be confirmed that each of the subset of features was not excluded from deployment (and/or enablement) for a particular tenant or server farm based on customer properties, a customer request, or otherwise. Further, it may be confirmed that each feature of the subset of features had not been edited (e.g., updated) for a configurable period of time. For instance, depending on the feature, it may be confirmed that the feature had not been edited for 7 days (for low risk features), for 14 days (for medium risk features), or for 30 days (for higher risk features). The period of time can be any period in a range from 1 day to 60 days, for example. In some aspects, when it has been determined that the subset of evaluated features meets each of the above criteria, the subset of evaluated features may be determined ready for graduation.

At add operation 212, the determined subset of evaluated features may be added to a graduation list (e.g., graduation list 118). When features are identified on the graduation list, engineers can be assured that the features are ready for graduation (i.e., 100% deployed/enabled worldwide, not identified on an exclusion list, and not edited within a period of time) before the flight is graduated. In this way, the risk of premature flight graduation is reduced.

At discontinue operation 214, evaluation of the determined subset of evaluated features may be discontinued. That is, when the determined subset of evaluated features is added to the graduation list, the feature may be "frozen" or "placed on ice" such that evaluation of the feature may be discontinued. By "freezing" features, runtime costs associated with evaluating a feature that is ready for graduation (but has not been graduated) are eliminated, thereby reducing the overall overhead associated with feature deployment.

At verify operation 216, at least one feature of the determined subset of evaluated features may be verified for graduation. That is, before graduating a flight corresponding to the selected feature, verifications may be performed as an additional safeguard. For instance, while the feature was pending on the graduation list, the feature may have been edited or may otherwise have been reviewed (e.g., a customer complaint was received). Accordingly, when an engineer selects a feature for graduation from the graduation list, data associated with the feature may be accessed to confirm that the feature was not reviewed and/or edited while the feature was pending on the graduation list.

At graduate operation 218, the verified feature may be graduated by removing the corresponding control mechanism from the program instructions. As a further safeguard, the corresponding control mechanism(s) (e.g., corresponding flight(s)) may be removed based on a ramp down policy. That is, the flight (code stub) may be removed first from deployed code that was enabled for a first subset of users in a first stage (e.g., 1% of a scope), then removed from deployed code that was enabled for a second subset of users in a second stage (e.g., 5% of a scope), and so on. In this way, if removal of the code stub proves to be improper for some reason, a customer outage is limited to the first 1% of the most dormant scope (e.g., a tenant, a server farm, etc.). Additionally or alternatively, a "soft delete" of the corresponding control mechanism may be performed. For instance, in response to receiving an indication from an engineer to remove the flight, deletion may be postponed for a configurable wait period. For example, the configurable wait period may be 7 days for a low-risk (low usage) feature, 14 days for a medium-risk (medium usage) feature, 30 days for a high-risk (high usage) feature, and so on. In some aspects, the wait period may be any period in a range from 1 day to 60 days, for example.

As should be appreciated, operations 202-218 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 3:
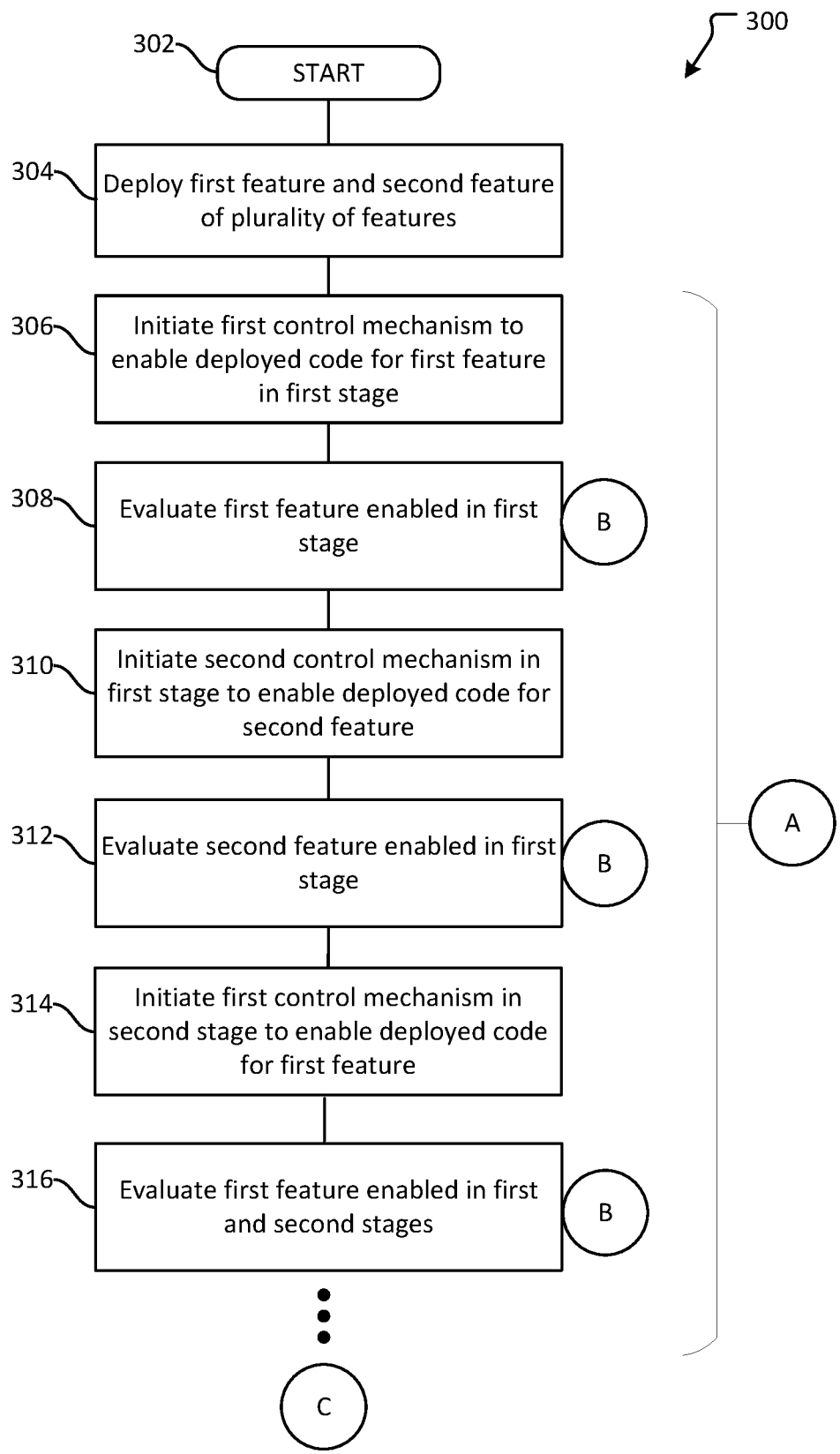
FIG. 3 illustrates an example method for staged enablement of features in accordance with aspects of the present disclosure.

FIG. 3 illustrates an example method for staged enablement of features in accordance with aspects of the present disclosure.

A general order of the operations for the method 300 is shown in FIG. 3. Generally, the method 300 starts with a start operation 302 and may continue as more features are deployed and initiated until it is determined the features are ready for graduation (see, e.g., step 210 of FIG. 2). In particular, the method 300 provides further details associated with steps 206 and 208 of FIG. 2. The method 300 may include more or fewer steps and/or may progress in a different order of steps from those shown in FIG. 3. The method 300 can be executed as a set of computer-executable instructions executed by a computer system and encoded or stored on a computer readable medium. Further, the method 300 can be performed by gates or circuits associated with a processor, an ASIC, an FPGA, a SOC or other hardware device. Hereinafter, the method 300 shall be explained with reference to the systems, components, devices, modules, software, data structures, data characteristic representations, signaling diagrams, methods, etc., described in conjunction with FIGS. 1-2, 4A-7B.

At deploy operation 304, program instructions (i.e., code) corresponding to a first feature and a second feature of a plurality of features may be deployed to customers (e.g., tenants) of a software provider. Based on the program instructions, the first and second features may be released, enhanced, updated, or replaced for use by tenants and their corresponding end users. In aspects, the program instructions (e.g., code) associated with the first feature and the second feature are deployed "dark" (e.g., with the associated first and second features turned OFF).

At initiate operation 306, a first control mechanism (e.g., first flight) may be initiated to enable the deployed program instructions associated with the first feature for a first subset of users in a first stage (e.g., 1% of a scope). As noted above, the first feature may be enabled (e.g., turned ON) in stages, or click stops, for random sets of deployed code (e.g., 1%, then 5%, then 10%, etc., of a scope). In aspects, early stages may enable the deployed code for a small subset of users (e.g., 1% or 5% of a scope). In this way, regression analysis and other evaluations may be conducted before the first feature is enabled (e.g., turned ON) for a broader customer base, thereby preventing customer service disruptions and/or feature dissatisfaction.

At evaluate operation 308, the first feature enabled in the first stage may be evaluated. That is, once the deployed code associated with the first feature has been enabled (e.g., turned ON), use of the first feature by end users associated with the first stage (e.g., 1% of scope) may be evaluated. For example, telemetry data may be used to perform regression analysis to quantify relationships between different variables associated with implementing the first feature and/or statistically determine the probabilities for success or failure of the first feature. Additionally or alternatively, the program instructions associated with the first feature may be evaluated to identify errors (e.g., utilizing a debugger). Additionally or alternatively, customer complaints (e.g., or the existence of customer complaints) regarding the first feature may be evaluated. If any exceptions (e.g., issues) are identified, an engineer may be alerted to review the first feature and/or update the program instructions associated with the first feature.

At initiate operation 310, a second control mechanism (e.g., second flight) may be initiated to enable the deployed program instructions associated with the second feature for a first subset of users in a first stage (e.g., 1% of a scope). As should be appreciated, the second control mechanism may be initiated at the same or different time than the first control mechanism. Furthermore, the scope associated with the first stage of enablement for the first feature may be different than the scope associated with the first stage of enablement for the second features. That is, while the first stage for each of the features may correspond to the same percentage of a scope (e.g., 1%), the scope for the first feature may be all users, whereas the scope for the second feature may be a server farm. In other examples, the scope associated with enabling the first and second features may be the same.

At evaluate operation 312, the second feature enabled in the first stage may be evaluated. That is, once the deployed code associated with the second feature has been enabled (e.g., turned ON), use of the second feature by end users associated with the first stage (e.g., 1% of scope) may be evaluated. As should be appreciated, evaluation of the second feature may occur at the same or a different time as evaluation of the first feature. For example, telemetry data may be used to perform regression analysis to quantify relationships between different variables associated with implementing the second feature and/or statistically determine the probabilities for success or failure of the second feature. Additionally or alternatively, the program instructions associated with the second feature may be evaluated to identify errors (e.g., utilizing a debugger). Additionally or alternatively, customer complaints (e.g., or the existence of customer complaints) regarding the second feature may be evaluated. If any exceptions (e.g., issues) are identified, an engineer may be alerted to review the second feature and/or update the program instructions associated with the second feature.

At initiate operation 314, the first control mechanism (e.g., first flight) may be initiated to enable the deployed program instructions associated with the first feature for a second subset of users in a second stage (e.g., 1% of a scope). As should be appreciated, while each feature is enabled progressively from a first stage until the feature is fully enabled for the scope, a number of factors (e.g., the time required for each stage, the associated scope, the amount or complexity of the associated program instructions, or any other factor) may influence the amount of time required to fully enable each feature. Thus, different features may be at different stages of enablement at any one time and the ordering of steps illustrated by FIG. 3 should not limit the disclosure to any particular sequence of steps.

At evaluate operation 316, the first feature enabled in the first and second stages may be evaluated. That is, once the deployed code associated with the first feature has been enabled (e.g., turned ON), use of the first feature by end users associated with the first and second stages (e.g., 5% of scope) may be evaluated. As noted above, an evaluation of a feature following each stage of enablement (e.g., after 1%, 5%, 10%, etc.) may be conducted. Moreover, evaluation of the feature and/or the program instructions associated with the feature may continue to be performed until the feature is graduated. The ongoing runtime evaluation of features involves allocation of one or more resources within the cloud computing environment that may be measured in terms of "performance cost" or "CPU consumption." This performance cost is an overhead cost to the software provider, which limits the scalability of feature deployment. Moreover, allocating resources to feature deployment can cause service disruptions for customers. For large software providers, thousands of features may be in different stages of deployment at any one time and the performance cost associated with feature deployment can be significant.

As should be appreciated, operations 302-316 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 4A:
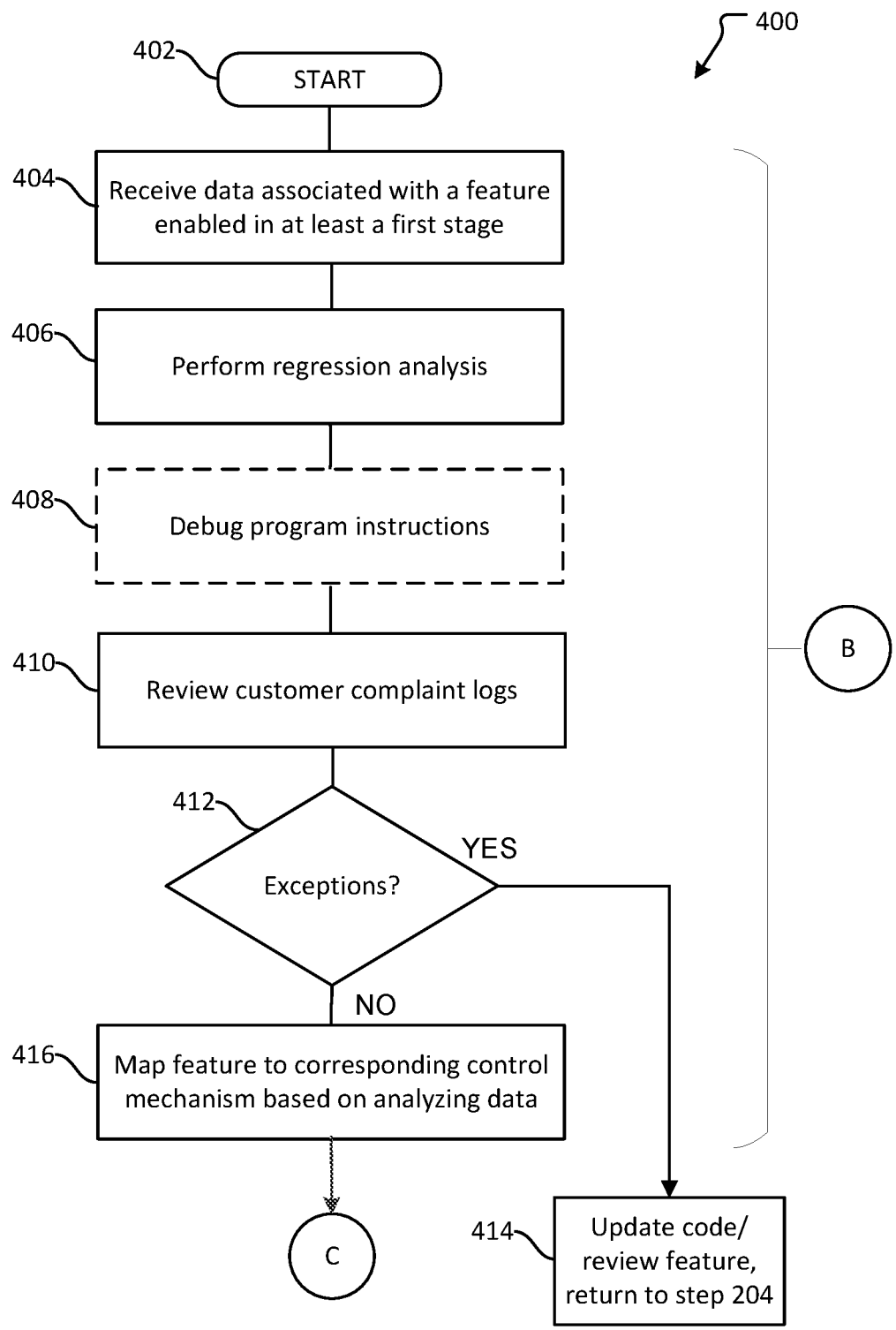
FIGS. 4A-4B illustrate an example method for evaluating a feature to determine whether the feature is ready for graduation in accordance with aspects of the present disclosure.
Figure 4B:
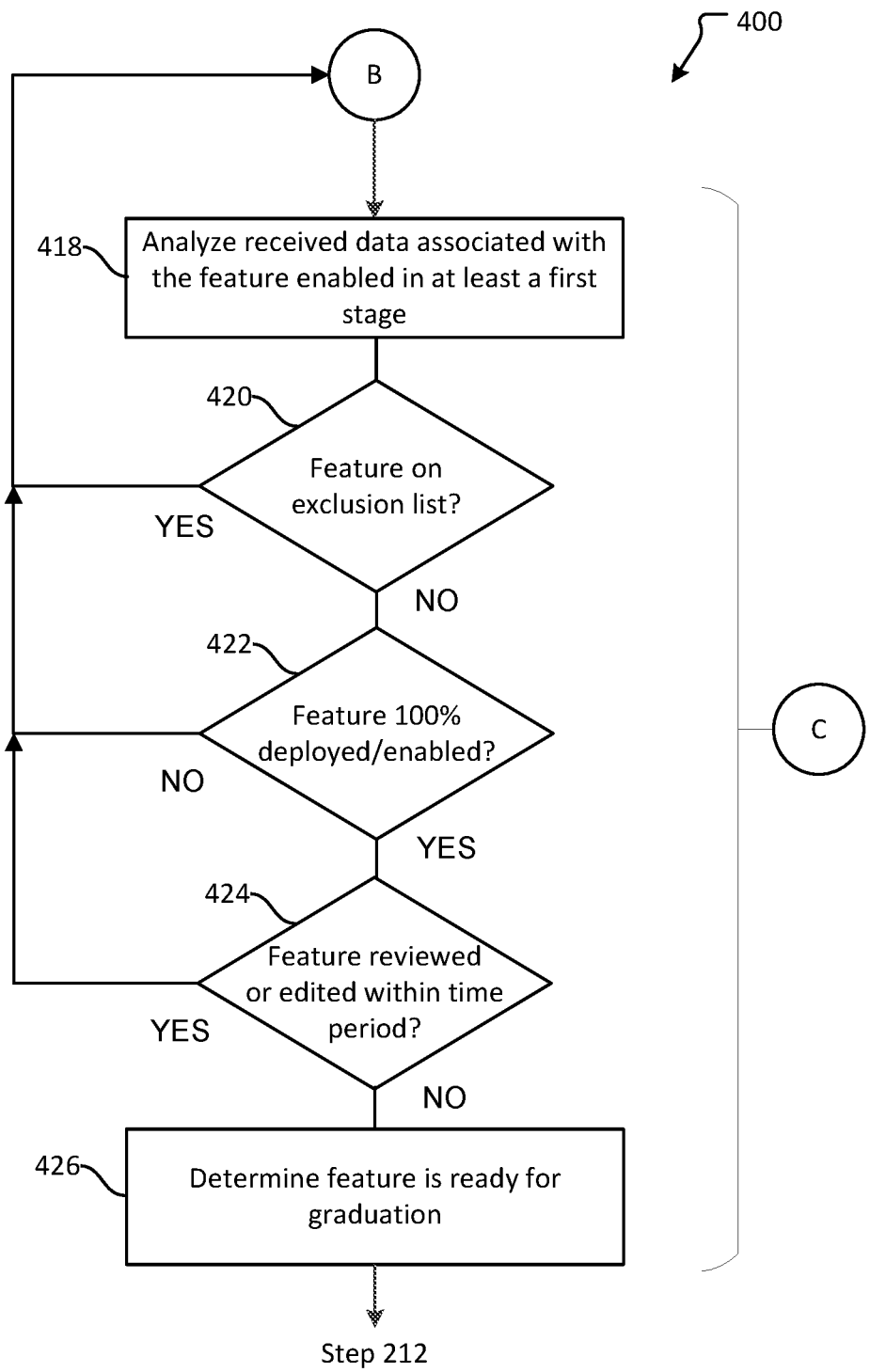

FIGS. 4A-4B illustrate an example method for evaluating a feature to determine whether the feature is ready for graduation in accordance with aspects of the present disclosure.

A general order of the operations for the method 400 is shown in FIGS. 4A-4B. Generally, the method 400 starts with a start operation 402 and provides further details associated with steps 208 and 210 of FIG. 2. The method 400 may include more or fewer steps and/or may progress in a different order of steps from those shown in FIG. 4. The method 400 can be executed as a set of computer-executable instructions executed by a computer system and encoded or stored on a computer readable medium. Further, the method 400 can be performed by gates or circuits associated with a processor, an ASIC, an FPGA, a SOC or other hardware device. Hereinafter, the method 400 shall be explained with reference to the systems, components, devices, modules, software, data structures, data characteristic representations, signaling diagrams, methods, etc., described in conjunction with FIGS. 1-3, 5-7B.

At receive operation 404, data associated with a feature that has been enabled in at least a first stage may be received. For example, after each stage, data may be collected from end users of tenants for whom the feature has been enabled (e.g., turned ON). The received data may include telemetry data (e.g., data collected based on use of the feature), log data (e.g., exception logs, error reports, help desk logs), customer complaints, or any other data associated with performance of or customer satisfaction with a feature. Additionally, received data may include statuses for each stage of enabling the feature, exclusion list(s) associated with the feature, and/or information regarding any engineer reviews of the feature and/or engineer updates to program instructions for the feature. The data may be received from the system and/or one or more tenants. In aspects, the data may be classified, organized, correlated, or otherwise compiled for purposes of evaluation or analysis.

At perform operation 406, regression analysis of program instructions associated with the feature may be performed. For example, telemetry data may be used to perform regression analysis to quantify relationships between different variables associated with implementing the feature and/or statistically determine the probabilities for success or failure of the feature.

At optional debug operation 408, the program instructions associated with the feature may be evaluated to identify errors (e.g., utilizing a debugger). While the bulk of the debugging process may occur prior to enabling a feature for use by end users, in some instances, the program instructions associated with the feature may be further evaluated to address performance issues with the feature.

At review operation 410, customer complaint logs may be reviewed. In further aspects, issue reports, exception reports, help desk calls, or other logged information regarding the performance of the feature may be reviewed.

At determination operation 412, it may be determined whether the feature is associated with any exceptions (e.g., issues). If the feature is associated with exceptions, the method may progress to update operation 414. Alternatively, if the feature is not associated with exceptions, the method may progress to map operation 416.

At update operation 414, the feature may be reviewed and/or the program instructions associated with the feature may be updated. For example, when exceptions are identified for the feature, an engineer may be alerted to review the feature and/or edit the program instructions associated with the feature.

At map operation 416, the feature may be mapped to a corresponding control mechanism (e.g., flight) based on analyzing the received data. For instance, received data (e.g., telemetry data) associated with user implementation of the feature may be analyzed to map the feature to a corresponding flight (or flights) that enabled the feature. In some aspects, a mapping table (or other relational database) may be created that links each feature to a corresponding flight (or flights). That is, each feature may be comprised of many flights (e.g., stubs in the code). By using special tags in the flight code, the flights may be grouped together and mapped to a particular feature.

At analyze operation 418, the received data associated with the feature may be analyzed. For instance, the received data may include telemetry data (e.g., data collected based on use of the feature), log data (e.g., exception logs, error reports, help desk logs), customer complaints, or any other data associated with performance of or customer satisfaction with a feature. Additionally, the received data may include statuses for each stage of enabling the feature, exclusion list(s) associated with the feature, and/or information regarding any engineer reviews of the feature and/or engineer updates to program instructions for the feature. The data may be received from the system and/or one or more tenants. In aspects, the received data may be classified, organized, correlated, or otherwise compiled for purposes of evaluation or analysis.

At determination operation 420, it may be determined whether the feature is associated with an exclusion list. For instance, an exclusion list may have prevented the feature from being deployed and/or enabled for at least a subset of end users based on customer properties (e.g., segment group such as "education"), a unique tenant identifier (e.g., GUID), a customer request for change management, and the like. If the feature was associated with an exclusion list, the method may return to evaluation of the feature (e.g., step 208 of FIG. 2). Alternatively, if the feature was not associated with an exclusion list, the method may progress to determination operation 422.

At determination operation 422, it may be determined whether the feature has been 100% deployed and enabled globally. That is, the feature has been deployed and enabled (e.g., turned ON) for all tenants hosted by the software provider. If the feature has been 100% deployed and enabled globally, the method may progress to determination operation 424. Alternatively, if the feature has not been 100% deployed and enabled globally, the method may return to evaluation of the feature (e.g., step 208 of FIG. 2).

At determination operation 424, it may be determined whether the feature has been reviewed and/or edited within a period of time. For instance, depending on the feature, it may be determined whether the feature has been reviewed and/or edited within 7 days (for low risk features), within 14 days (for medium risk features), or within 30 days (for higher risk features). The period of time can be any period in a range from 1 day to 60 days, for example. If the feature was reviewed and/or edited within the period of time, the method may return to evaluation of the feature (e.g., step 208 of FIG. 2). Alternatively, if the feature was not reviewed and/or edited within the period of time, the method may progress to determine operation 426.

At determine operation 426, it may be determined that the feature is ready for graduation. In this case, it has been determined that the feature has been 100% deployed and enabled for all tenants (e.g., the global customer base), the feature was not identified on an exclusion list, and the feature has not been reviewed or edited (e.g., updated) for the period of time. When it has been determined that the feature is ready for graduation, the method may progress to step 212 of FIG. 2.

As should be appreciated, operations 402-426 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 5:
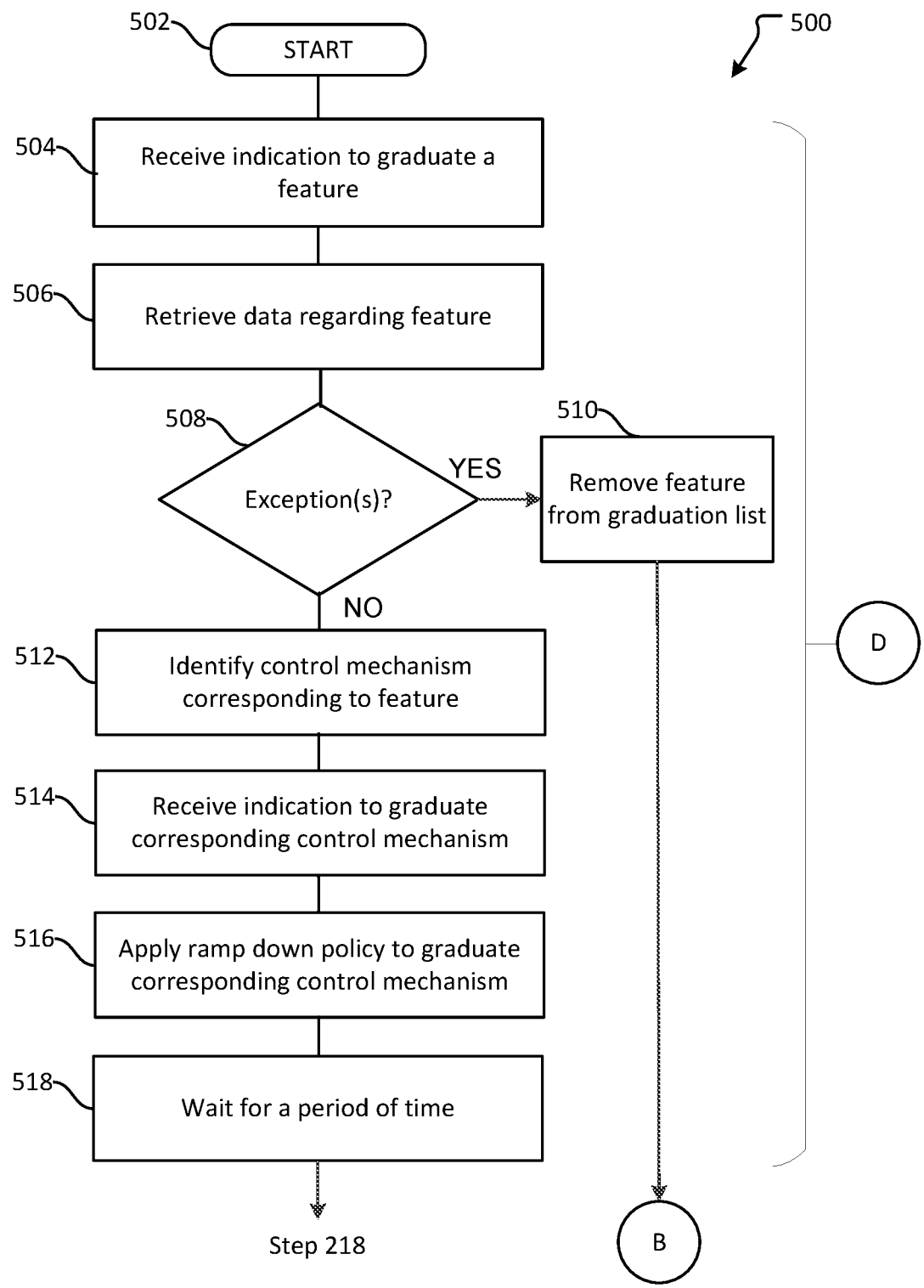
FIG. 5 illustrates an example method for verifying that a feature is ready for graduation in accordance with aspects of the present disclosure.

FIG. 5 illustrates an example method for verifying that a feature is ready for graduation in accordance with aspects of the present disclosure.

A general order of the operations for the method 500 is shown in FIG. 5. Generally, the method 500 starts with a start operation 502 and provides further details associated with step 216 of FIG. 2. The method 500 may include more or fewer steps and/or may progress in a different order of steps from those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1-4B, 6-7B.

At receive operation 504, an indication to graduate a feature may be received. In aspects, it may have previously been determined that the feature was ready for graduation and the feature may have been added to a graduation list. In some aspects, the indication to graduate the feature may be received in response to an engineer selecting the feature for graduation from the graduation list.

At retrieve operation 506, data may be retrieved for the feature. For example, the retrieved data may include telemetry data (e.g., data collected based on use of the feature), log data (e.g., exception logs, error reports, help desk logs), customer complaints, or any other data associated with performance of or customer satisfaction with a feature. Additionally, retrieved data may include information regarding any engineer reviews of the feature and/or engineer updates to program instructions for the feature.

At determination operation 508, it may be determined based on the retrieved data whether the feature is associated with any exceptions. For instance, while the feature was pending on the graduation list, the feature may have been edited or may otherwise have been reviewed (e.g., a customer complaint was received). If it is determined that the feature is associated with an exception, the method may progress to remove operation 510. If it is determined that the feature is not associated with an exception, the method may progress to identify operation 512.

At remove operation 510, the feature may be removed from the graduation list. That is, in view of the exception associated with the feature, the feature is no longer ready to be graduated. After removal of the feature from the graduation list, the method may return to evaluation of the feature (e.g., step 208 of FIG. 2).

At identify operation 512, a control mechanism corresponding to the feature may be identified. For instance, a mapping table or relational database may be accessed to identify the control mechanism corresponding to the feature. In aspects, the mapping table (or other relational database) may link a plurality of features to corresponding control mechanisms (or flights).

At receive operation 514, an indication to graduate the corresponding control mechanism may be received. In aspects, graduating the corresponding control mechanism may involve removing the code stub that enabled (or turned ON) the program instructions associated with the feature. When the code stub is removed, engineers may no longer have control of enabling (turning ON) the feature.

At apply operation 516, as an additional safeguard, a ramp down policy may be applied to remove the corresponding control mechanism. For example, the code stub associated with the corresponding control mechanism may be removed first from the subset of deployed code that was enabled first (e.g., 1%), then removed from the subset of deployed code that was enabled second (e.g., 5%), and so on. In this way, if removal of the code stub proves to be improper for some reason, a customer outage is limited to the first 1% (or 5%) of the most dormant scope (e.g., a tenant, a server farm, etc.).

At wait operation 518, as a further safeguard, a "soft delete" of the corresponding control mechanism may be performed. For instance, in response to receiving an indication to graduate the corresponding control mechanism (or flight), deletion of the flight may be postponed for a configurable wait period. For example, the configurable wait period may be 7 days for a low-risk (low usage) feature, 14 days for a medium-risk (medium usage) feature, 30 days for a high-risk (high usage) feature, and so on. In some aspects, the wait period may be any period in a range from 1 day to 60 days, for example. After the wait period, the method may progress to step 218 of FIG. 2.

As should be appreciated, operations 502-518 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 6:
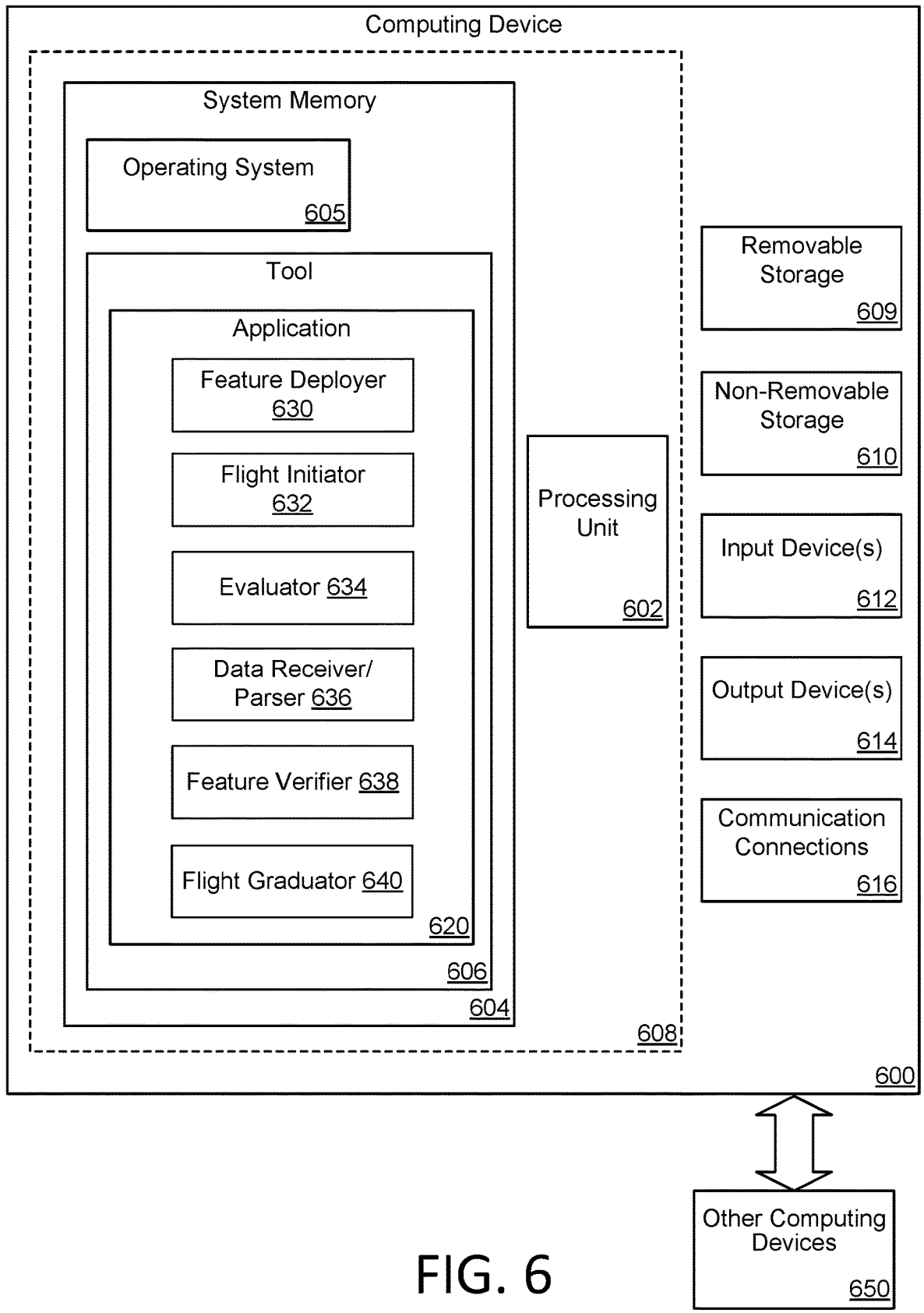
FIG. 6 is a block diagram illustrating physical components of a computing device with which aspects of the disclosure may be practiced.

FIG. 6 is a block diagram illustrating physical components (e.g., hardware) of a computing device 600 with which aspects of the disclosure may be practiced.

The computing device components described below may be suitable for the computing devices described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program tools 606 suitable for performing the various aspects disclosed herein such. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program tools and data files may be stored in the system memory 604. While executing on the processing unit 602, the program tools 606 (e.g., an application 620) may perform processes including, but not limited to, the aspects, as described herein. The application 620 includes feature deployer 630, flight initiator 632, evaluator 634, data receiver/parser 636, feature verifier 638, and flight graduator 640, as described in more detail with regard to FIG. 1.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 600 may also have one or more input device(s) 612, such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
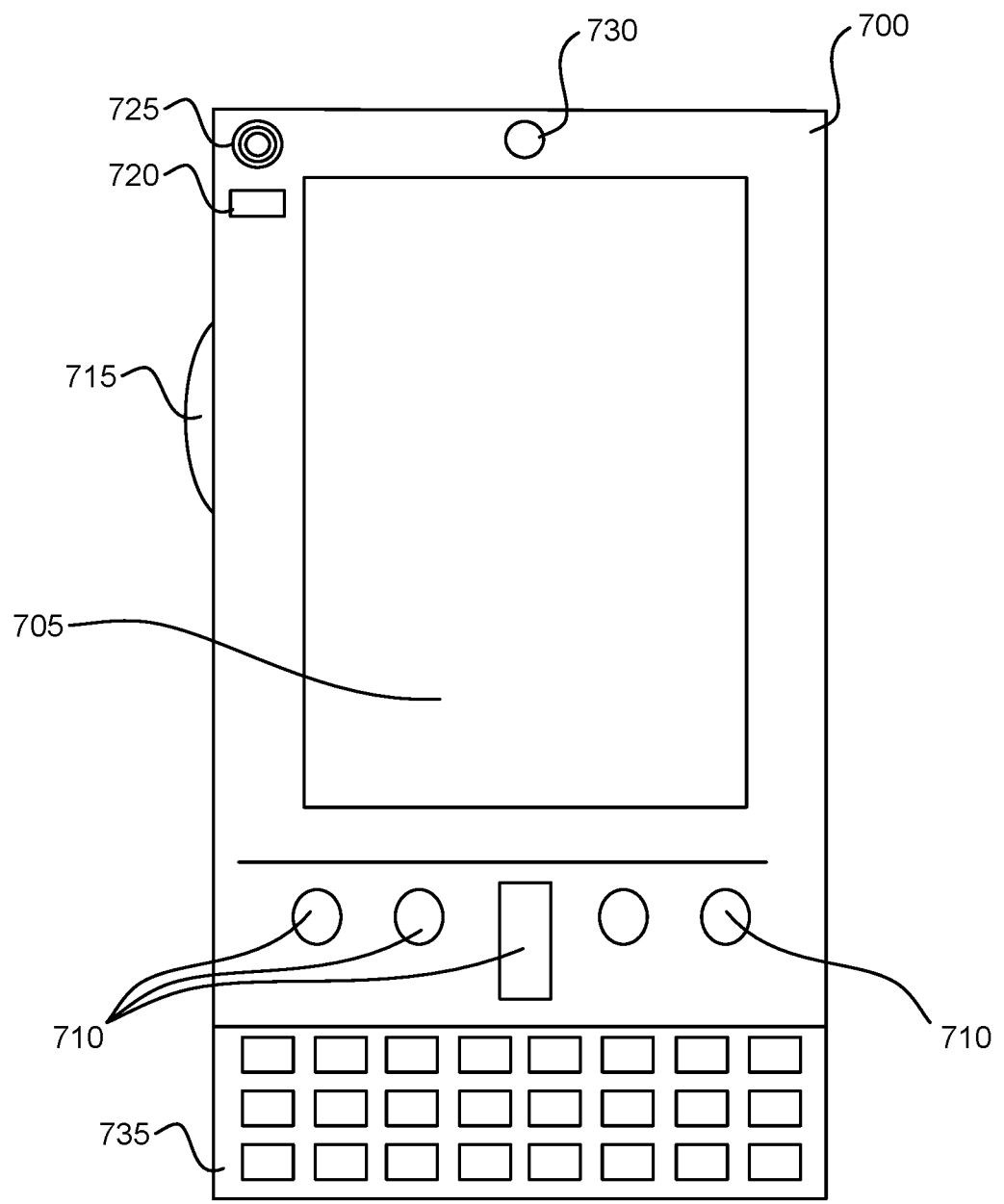
FIG. 7A is a simplified diagram of a mobile computing device with which aspects of the present disclosure may be practiced.
Figure 7B:
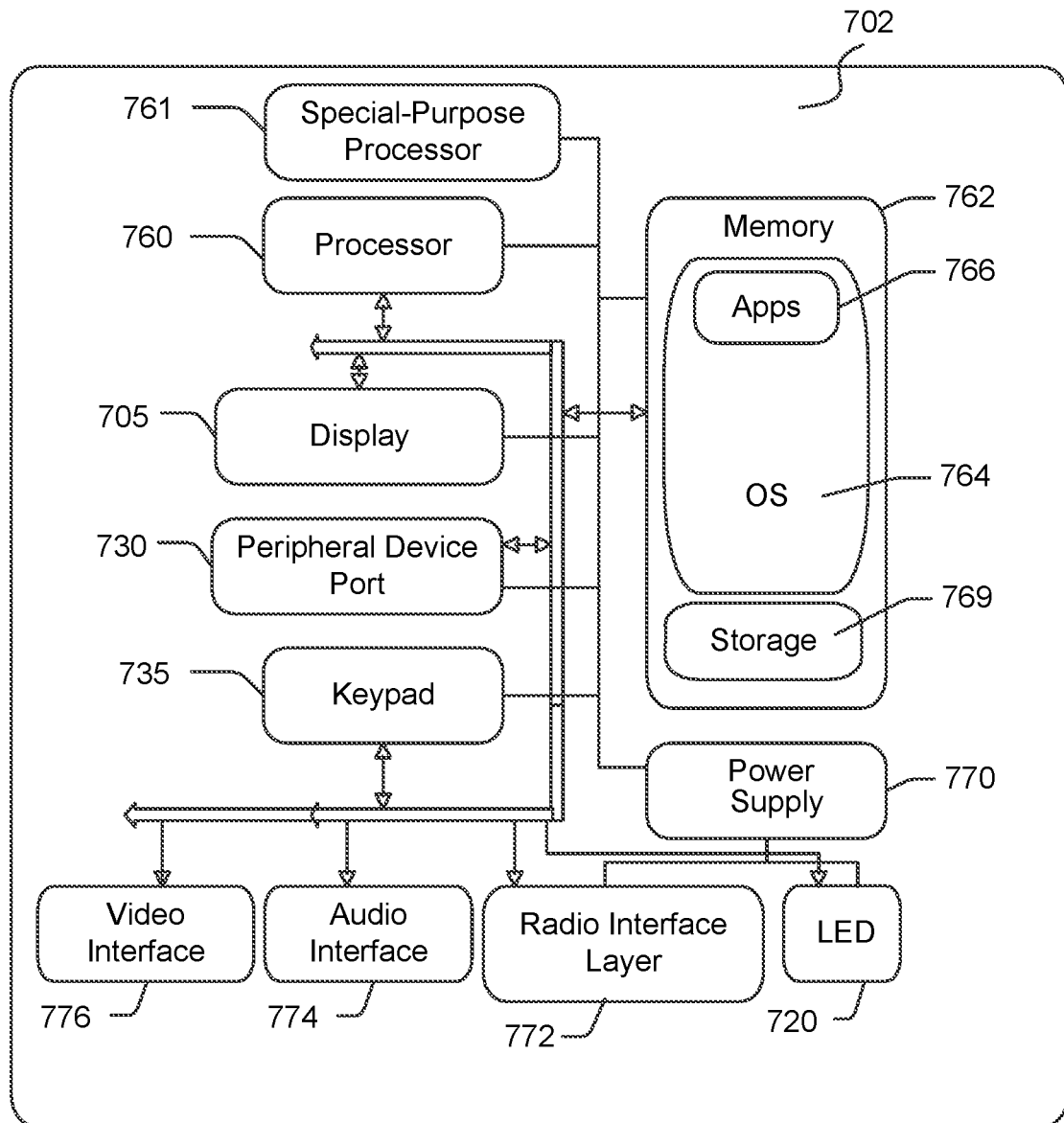
FIG. 7B is another simplified block diagram of a mobile computing device with which aspects of the present disclosure may be practiced.

FIGS. 7A and 7B illustrate a computing device or mobile computing device 700, for example, a mobile telephone, a smart phone, wearable computer (such as a smart watch), a tablet computer, a laptop computer, and the like, with which aspects of the disclosure may be practiced. In some aspects, the client (e.g., computing devices of end users 104 in FIG. 1) may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some aspects. In yet another alternative aspect, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 720 (e.g., a light emitting diode), and/or an audio transducer (e.g., a speaker, not shown). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of computing device, a server, a mobile computing device, etc. That is, the computing device 700 can incorporate a system 702 (additionally or alternatively an architecture) to implement some aspects. The system 702 can implemented as a "smart phone" capable of running one or more applications (e.g., browser, e-mail, calendaring, contact managers, messaging clients, games, and media clients/players). In some aspects, the system 702 is integrated as a computing device, such as an integrated digital assistant (PDA) and wireless phone.

One or more application programs 766 may be loaded into the memory 762 and run on or in association with the operating system 764. Examples of the application programs include phone dialer programs, e-mail programs, information management (PIM) programs, word processing programs, spreadsheet programs, Internet browser programs, messaging programs, and so forth. The system 702 also includes a non-volatile storage area 769 within the memory 762. The non-volatile storage area 769 may be used to store persistent information that should not be lost if the system 702 is powered down. The application programs 766 may use and store information in the non-volatile storage area 769, such as e-mail or other messages used by an e-mail application, and the like. A synchronization application (not shown) also resides on the system 702 and is programmed to interact with a corresponding synchronization application resident on a host computer to keep the information stored in the non-volatile storage area 769 synchronized with corresponding information stored at the host computer. As should be appreciated, other applications may be loaded into the memory 762 and run on the mobile computing device 700 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer (e.g., speaker, not shown)). In the illustrated configuration, the visual indicator 720 is a light emitting diode (LED). These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer (e.g., speaker), the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 769.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for reliable feature graduation, the method comprising:
    deploying code for a feature of a plurality of features to a plurality of tenants, wherein the deployed code is not enabled for execution;
    initiating at least one code stub to execute the deployed code to enable the feature for use by a first subset of users associated with the plurality of tenants;
    initiating the at least one code stub to execute the deployed code to enable the feature for use by at least a second subset of users associated with the plurality of tenants;
    evaluating telemetry data associated with runtime use of the enabled feature by at least the first subset of users and the second subset of users;
    based on the evaluation of the telemetry data, determining a performance of the enabled feature;
    mapping the performance of the enabled feature to the at least one code stub;
    when the performance of the enabled feature meets one or more criteria, determining that the feature is ready to be graduated;
    when the feature is ready to be graduated, discontinuing evaluation of the enabled feature; and
    providing an indication to remove the at least one code stub based on the mapping.

2. The computer-implemented method of claim 1, wherein the indication to remove the at least one code stub comprises adding the feature to a graduation list, the method further comprising:

verifying that the feature has not been edited within a period of time; and removing the at least one code stub mapped to the performance of the enabled feature.

3. The computer-implemented method of claim 2, wherein the at least one code stub is removed based on a ramp down policy.

4. The computer-implemented method of claim 3, wherein the ramp down policy specifies that at least a first code stub associated with the deployed code for the first subset of users be removed before at least a second code stub associated with the deployed code for the second subset of users.

5. The computer-implemented method of claim 1, wherein evaluating the performance of the enabled feature comprises evaluating runtime use of one or more resources associated with a cloud computing environment hosting the plurality of tenants.

6. The computer-implemented method of claim 1, wherein evaluating the performance of the enabled feature comprises collecting telemetry data regarding use of the enabled feature by the first subset of users and the second subset of users.

7. The computer-implemented method of claim 1, wherein determining that the feature is ready to be graduated further comprises determining that the enabled feature is available to all tenants of the plurality of tenants.

8. The computer-implemented method of claim 7, wherein the first subset of users and the second subset of users are associated with all tenants of the plurality of tenants.

9. The computer-implemented method of claim 7, wherein determining that the feature is ready to be graduated further comprises determining that the feature has not been edited for a period of time.

10. The computer-implemented method of claim 9, wherein the period of time is within a range of 1 day to 60 days.

11. The computer-implemented method of claim 1, wherein the at least one code stub is mapped to the performance of the enabled feature in a mapping table.

12. The computer-implemented method of claim 1, wherein the indication to remove the at least one code stub comprises adding the feature to a graduation list, the method further comprising:

waiting a period of time; and removing the at least one code stub associated with the feature.

13. A system, comprising:

at least one processor; and at least one memory storing computer-executable instructions that when executed by the at least one processor cause the system to perform operations, comprising:

deploy code for a feature of a plurality of features to a plurality of tenants, wherein the deployed code is not enabled for execution;

initiate at least one code stub to execute the deployed code to enable the feature for use by the plurality of tenants;

evaluate telemetry data associated with use of the enabled feature by the plurality of tenants;

based on the evaluation of the telemetry data, determine a performance of the enabled feature;

link the performance of the enabled feature to the at least one code stub;

when the performance of the enabled feature meets one or more criteria, determine that the feature is ready to be graduated;

when the feature is ready to be graduated, discontinue evaluation of the enabled feature; and provide an indication to remove the at least one code stub based on the linking.

14. The system of claim 13, wherein the indication to remove the at least one code stub comprises adding the feature to a graduation list, the computer-executable instructions when executed causing the system to perform further operations, comprising:

verify that the feature has not been edited within a period of time; and remove the at least one code stub linked to the performance of the enable feature.

15. The system of claim 14, wherein the at least one code stub is removed based on a ramp down policy.

16. The system of claim 13, wherein evaluating the performance of the enabled feature comprises evaluating runtime use of one or more resources associated with a cloud computing environment hosting the plurality of tenants.

17. The system of claim 13, wherein evaluating the performance of the enabled feature comprises collecting telemetry data regarding use of the enable feature by the plurality of tenants.

18. A computer storage medium storing computer-executable instructions that when executed a processor cause a computer system to perform operations, comprising:

deploy code for a feature of a plurality of features to a plurality of tenants, wherein the deployed code is not enabled for execution;

initiate at least one code stub to execute the deployed code to enable the feature for the plurality of tenants;

evaluate telemetry data associated with use of the enabled feature by the plurality of tenants;

based on the evaluation of the telemetry data, determine a performance of the enabled feature:

link the performance of the enabled feature to the at least one code stub;

when the performance of the enabled feature meets one or more criteria, determine that the feature is ready to be graduated;

when the feature is ready to be graduated, discontinue evaluation of the enabled feature; and provide an indication to remove the at least one code stub based on the linking.

19. The computer storage medium of claim 18, wherein the indication to remove the at least one code stub comprises adding the feature on a graduation list, the computer-executable instructions when executed causing the computer system to perform further operations, comprising:

verify that the feature has not been edited within a period of time; and remove the at least one code stub linked to the performance of the enabled feature.

20. The computer storage medium of claim 18, wherein the at least one code stub is removed based on a ramp down policy.

* * * * *